(12) United States Patent
Harris

(10) Patent No.: US 8,535,818 B2
(45) Date of Patent: Sep. 17, 2013

(54) METHOD AND APPARATUS FOR REJUVENATION OF DEGRADED POUCH-TYPE LITHIUM ION BATTERY CELLS

(75) Inventor: Stephen J. Harris, Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 958 days.

(21) Appl. No.: 12/609,375

(22) Filed: Oct. 30, 2009

(65) Prior Publication Data

US 2010/0124691 A1 May 20, 2010

Related U.S. Application Data

(60) Provisional application No. 61/116,076, filed on Nov. 19, 2008.

(51) Int. Cl.
*H01M 10/42* (2006.01)
*H01M 6/50* (2006.01)

(52) U.S. Cl.
USPC .............. 429/49; 429/52; 429/95; 429/123

(58) Field of Classification Search
USPC .............. 429/49, 94, 307, 47, 185, 50–52, 429/95, 123, 131, 136, 149, 156, 163, 324; 204/419; 205/57; 141/302
IPC .............................. H01M 10/42,6/50
See application file for complete search history.

(56) References Cited

U.S. PATENT DOCUMENTS

| | | | |
|---|---|---|---|
| 6,944,010 B1 | 9/2005 | Paul et al. | |
| 7,138,042 B2 | 11/2006 | Tran et al. | |
| 7,201,998 B2 | 4/2007 | Kim | |
| 2005/0244704 A1* | 11/2005 | Sloop et al. | 429/49 |
| 2006/0216585 A1 | 9/2006 | Lee | |
| 2006/0269831 A1 | 11/2006 | Kim | |
| 2007/0224498 A1* | 9/2007 | Kim et al. | 429/152 |
| 2008/0066297 A1 | 3/2008 | Lin et al. | |
| 2009/0242073 A1* | 10/2009 | Reschke | 141/7 |
| 2010/0068605 A1* | 3/2010 | Harris et al. | 429/47 |

OTHER PUBLICATIONS

Andersson et al., Chemical Compositon and Morphology of the Elevated Temperature SEI on Graphite; Journal of the Electrochemical Society; 148; (10)A1100-A1109(2001).

Du Pasquier et al., Differential Scanning Calorimetry Study of the Reactivity of Carbon Anodes in Plastic Li-lon Batteries; J. Electrochem. Soc., vol. 145, No. 2, Feb. 1998.

(Continued)

*Primary Examiner* — Basia Ridley
*Assistant Examiner* — Heng Chan
(74) *Attorney, Agent, or Firm* — BrooksGroup

(57) ABSTRACT

One embodiment includes a method including use of a manifold connected to one or more pouches for rejuvenating failed or degraded pouch-type lithium-ions batteries.

23 Claims, 3 Drawing Sheets

(56) References Cited

OTHER PUBLICATIONS

Broussely et al, Aging Mechanism in Li Ion Cells and Calendar Life Predictions; Journal of Power Sources; 97-98 (2001)13-21.

Abraham et al., Performance Degradation of High-Power Lithium-Ion Cells- Electrochemistry of Harvested Electrodes; Journal of Power Sources 170 (2007) 465-475.

Vetter et al., Ageing Mechanisms in Lithium-Ion Batteries; Journal of Power Sources 147 (2005) 269-281.

Cohen et al., Micromorphological Studies of Lithium Electrodes in Alkyl Carbonate Solutions Using in Situ Atomic Force Microscopy; J. Phys. Chem B 2000, 104, 12282-12291.

Leroy et al., Influence of the Lithium Salt Nature over the Surface Film Formation on a Graphite Electrode in Li-Ion Batteries; An XPS Study; Applied Surface Science 253 (2007) 4895-4905.

Itou et al., Performance of $LiNiCoO_2$ Materials for Advanced Lithium-Ion Batteries; Journal of Power Sources 146 (2005) 39-44.

\* cited by examiner

METHOD AND APPARATUS FOR REJUVENATION OF DEGRADED POUCH-TYPE LITHIUM ION BATTERY CELLS

This application claims the benefit of U.S. Provisional Application No. 61/116,076 filed Nov. 19, 2008.

TECHNICAL FIELD

The field to which the disclosure relates includes rejuvenation and reuse of degraded pouch type lithium ion batteries.

BACKGROUND

Lithium-ion batteries are a type of rechargeable battery in which a lithium ion moves between a negative electrode and a positive electrode. Lithium ion batteries are commonly used in consumer electronics. In addition to uses for consumer electronics, lithium-ion batteries are growing in popularity for defense, automotive, and aerospace applications due to their high energy density.

FIG. 1 illustrates a top plan view of a conventional lithium ion battery 10 that may be used in automotive applications having an electrode assembly 12 and a pouch 14, which may be formed with an interior region 16 for receiving the electrode assembly 12. The components of the electrode assembly 12 and pouch 14 are illustrative of the basic components and not intended to be depicted in proper orientation or scale.

The electrode assembly 12 may include a first electrode plate 20, a second electrode plate 30, and a separator 40 arranged between the first and second electrode plates 20 and 30 to prevent a short circuit between the first and second electrode plates 20 and 30 and allowing only lithium ions to pass through it. The electrode assembly 12 may be formed by winding the first electrode plate 20, the separator plate 40, and the second electrode plate 30 into a jelly roll type structure. Alternatively, as shown in FIG. 1, the first electrode plate 20, the separator 40, and the second electrode plate 30 may be sequentially laminated into a stack structure. The first electrode plate 20 may be a negative electrode, while the second electrode plate 30 may be a positive electrode, although the reverse arrangement is contemplated. A liquid electrolyte 45 is also introduced within the interior region 16 of the pouch 14 prior to the pouch 14 being sealed.

A positive tab 50 and a negative tab 52 electrically connected to the respective electrode plates 20, 30 of the electrode assembly 10 may be installed such that a predetermined length of them may be exposed outside the case pouch 14. Portions of the electrode tabs 50 and 52 that come in contact with the case pouch 14 may be wrapped with an insulating tape (not shown).

The positive electrode 20 may be formed by coating a strip shaped metal plate such as a positive collector with a positive active material. In one exemplary embodiment, the metal plate may be made of an aluminum film, while the positive active material may be formed from a lithium based oxide as a main component, a binder, and a conductive material. The positive electrode 20 may be electrically connected to a positive tab 50 and wrapped with insulating tape (not shown).

The negative electrode 30 may be formed by coating a strip shaped metal plate such as a negative collector with a negative active material. The metal plate may be made of a copper film while the negative active material may be formed from a carbon material as a main component, a binder, and a conductive material. The negative electrode 30 may be electrically connected to the negative tab 52 and wrapped with insulating tape (not shown).

The separator 40 may be made of a polyethylene film, a polypropylene film, or a combination thereof. The separator 40 may be formed to be wider than the positive and negative plates 20 and 30 to prevent a short circuit between the positive and negative plates 20 and 30.

The liquid electrolyte 45 may include solid lithium salt electrolytes such as $LIPF_6$, $LIBF_4$, or $LICIO_4$, and organic solvents such as carbonate. The liquid electrolyte 45 conducts lithium ions, which acts as a carrier between the negative electrode 30 and the positive electrode 20 when the battery 10 passes an electric current through an external circuit.

The pouch 14 may be formed from a wide variety of materials that are both flexible and heat sealable such that no air or water vapor may enter. The pouch 14 may be a laminate material consisting of aluminum and plastic.

Both the positive electrode 20 and negative electrode 30 are materials into which and from which lithium can migrate. When a cell is discharging, the lithium is extracted from the negative electrode 20 and inserted into the positive electrode 30. When the cell is charging, the reverse process occurs: lithium is extracted from the positive electrode 30 and inserted into the negative electrode 20.

SUMMARY OF EXEMPLARY EMBODIMENTS OF THE INVENTION

One exemplary embodiment includes a method for rejuvenating a pouch type lithium ion battery, the method including providing at least one pouch sealably connected via first tubing to a first manifold, said at least one pouch containing a first electrolyte and an electrode assembly, said at least one pouch sealably connected against an external atmosphere; introducing a solvent into the first manifold and into said at least one pouch to treat a respective electrode assembly contained within said at least one pouch; removing a substantial portion of said solvent from said at least one pouch; introducing a second electrolyte into the first manifold and into said at least one pouch; and, sealing the pouch against said external atmosphere.

Other exemplary embodiments will become apparent from the detailed description provided hereinafter. It should be understood that the detailed description and specific examples, while disclosing exemplary embodiments, are intended for purposes of illustration only and are not intended to limit the scope of the invention.

BRIEF DESCRIPTION OF THE DRAWINGS

The following description of the embodiment(s) is merely exemplary (illustrative) in nature and is in no way intended to limit the invention, its application, or uses.

DETAILED DESCRIPTION OF EXEMPLARY EMBODIMENTS

The following description of the embodiment(s) is merely exemplary (illustrative) in nature and is in no way intended to limit the invention, its application, or uses.

The exemplary embodiments herein may disclose methods for rejuvenating a pouch type lithium ion battery, including the conventional lithium ion battery 10 described above in FIG. 1. As such, the methods herein will be described in conjunction with rejuvenating one or more conventional pouch-type lithium ion batteries, which may include the pouch-type of lithium ion battery 10 shown in FIG. 1. In addition, the methods described herein may also be utilized in rejuvenating other prismatic lithium ion battery cells to which pouch-type lithium ion battery cells are a subset.

Figure 1:
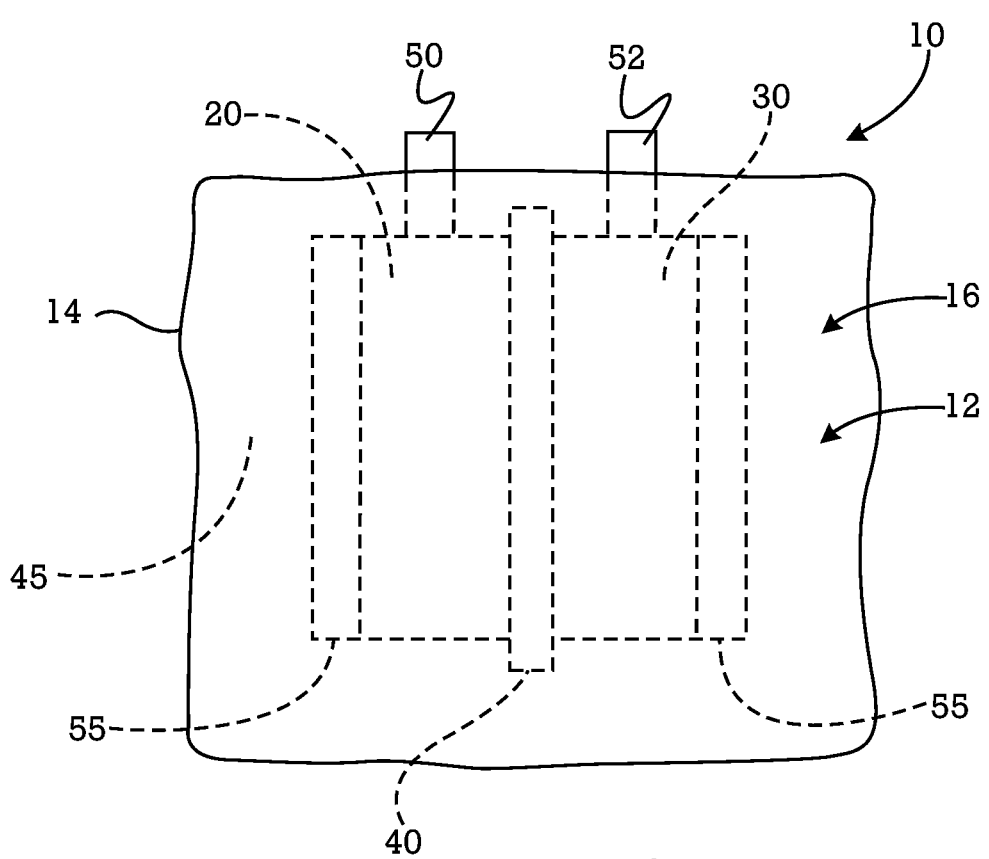
FIG. 1 is a perspective view of a lithium ion battery in accordance with the prior art.

During operation of the lithium ion battery 10 such as described in FIG. 1, a portion of the liquid electrolyte 45 may be decomposed to form lithium salts and other polymeric materials that make up a solid electrolyte interphase (SEI) layer e.g., 55, including the solid electrolyte salts, on the surfaces the negative electrode 30 and/or the positive electrode 20. The SEI layer 55, including precipitation of lithium fluoride (LiF) from the liquid electrolyte 45 on the electrodes, is thought to detrimentally affect the conducting of lithium ions which may lead to power and capacity loss of a battery.

Another mode of degradation is deposition of Mn (instead of SEI) on the carbon negative electrode in the case of Mn-based positive electrodes. The Mn or any other contaminant may be removed for the cell using an appropriate solvent in a similar manner that SEI is removed to rejuvenate the cells as will be appreciated from the following description of exemplary embodiments.

The power and capacity loss associated with the SEI layer, as well as the decomposition of the liquid electrolyte, are thought to be at least partially reversible, and it has been found that a low power and capacity battery may be able to recover at least a portion of its power and capacity for further use by reversing the effects associated with the SEI layer and/or by the decomposition of the liquid electrolyte.

Thus, the exemplary methods and apparatus described herein may be used to rejuvenate one or more pouch-type lithium ion batteries, such as that depicted in FIG. 1.

In select exemplary methods, a solvent may be selected to introduce into the interior region of a pouch where the solvent remains in contact with battery electrodes for a sufficient period of time to substantially remove a portion of an SEI layer including lithium fluoride (LiF) and other deleterious materials. The solvent may first be heated to an elevated temperature sufficient to enhance removal of the SEI layer without otherwise harming the components of a battery.

In select exemplary methods described below, the selected solvents may include carbonate solvents which may be heated and introduced into a manifold and respective pouches to contact battery electrodes. For example, the solvents may be heated to a temperature of from about 50° C. to about 100° C., or from about 80° C. to about 100° C., and may remain within the pouches for a period of from about 1 minute to about 60 minutes, or from about 10 minutes to about 30 minutes. Exemplary carbonate solvents that may be utilized include ethylene carbonate, diethyl carbonate, ethyl carbonate, methyl carbonate, propylene carbonate, dimethyl carbonate, and mixtures thereof.

Figure 2A:
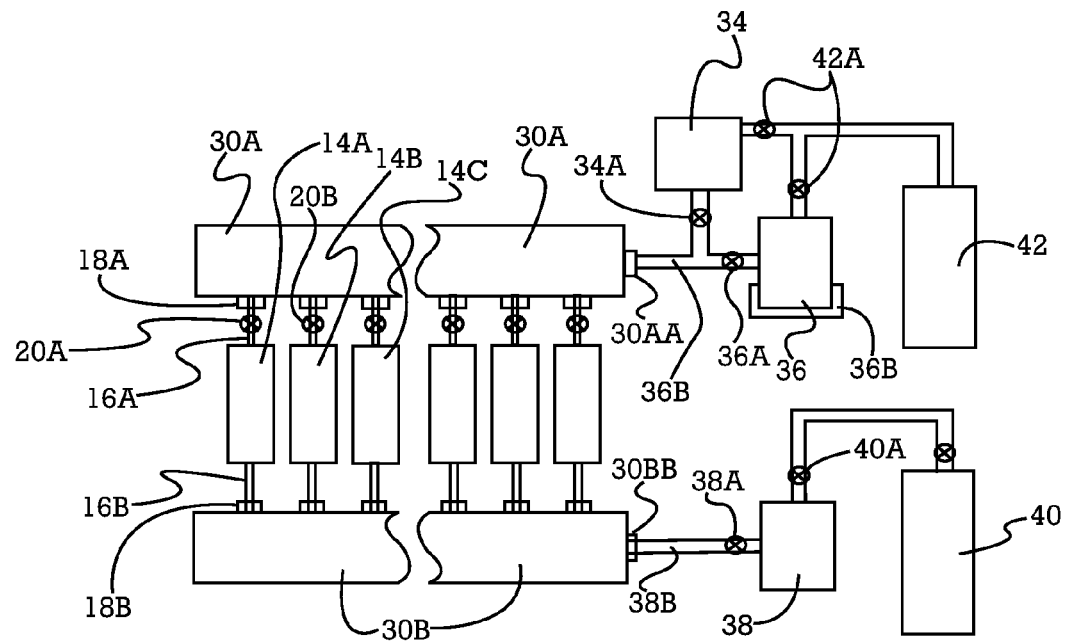
FIG. 2A is a top view of electrolyte manifolds that may be used in rejuvenating one or more lithium ion batteries according to an exemplary embodiment.

In an exemplary embodiment, referring to FIG. 2A, one or more pouches e.g., 14A, 14B, 14C are shown where each pouch contains an electrode assembly, such as electrode assembly 12 shown in FIG. 1. The one or more pouches are provided including at least two tubes, e.g., molded-in tubes 16A and 16B, whereby each of the tubes is adapted for introducing and/or extracting electrolyte to and/or from an associated manifold, e.g., 30A and 30B while maintaining the electrolyte isolated from the external atmosphere. The pouches e.g., 14A, 14B, 14C may be conventional pouches used for conventional pouch-type lithium ion batteries and may be formed from a wide variety of materials that are preferably both flexible and heat sealable and are impervious to the external atmosphere including water vapor.

For example, a pouch may be formed of a formable (moldable) laminate material including metal foil e.g., aluminum and plastic as is known in the art where the tubes are molded-in to the structure of the pouch during manufacture and become part of the structure of the pouch. It will be appreciated that the tubes e.g., 16A and 16B, may also be sealed into the pouches in a process separate from a mold-in manufacturing process, e.g., by thermally fusing, welding or gluing the tubes to a respective pouch following pouch manufacture.

In an exemplary embodiment, a pouch e.g., 14A may include one or more external plastic layers (external to pouch) and internal layers (internal to pouch) and an intermediate metal foil layer, such as aluminum. It will be appreciated that an individual pouch e.g., 14A may be contained in a separate individual casing (not shown) or that a plurality of pouches e.g., 14A, 14B, 14C may be laminated together (e.g., thermally fused or welded) and inserted into a separate casing (not shown) to create a multi-celled battery with the cells connected in series.

The pouches e.g., 14A, 14B, 14C may be made by conventional molding manufacturing processes that are known in the art to include molding the at least two tubes e.g., 16A and 16B extending from the exterior of the pouch and communicating with an interior portion of the pouch. The at least two tubes e.g., 16A and 16B may be on any portion of the exterior of the pouch, and in an exemplary embodiment (FIG. 2A) are shown placed on opposite sides of the pouch to communicate with a respective manifold e.g., 30A and 30B. It will also be appreciated that the at least two tubes e.g., 16A and 16B may be placed on the same side of a pouch, e.g., 14A (FIG. 2B) to communicate with stacked manifold portions 30A and 30B.

The tubes e.g., 16A and 16B may be of a variety of diameters suitable for introducing and/or extracting electrolyte to and/or from a respective manifold within a reasonable amount of time, e.g., on the order of minutes. In an exemplary embodiment, the tubes may be less than or equal to about ¼ inch in diameter, more preferably less than or equal to about ⅛ inch in diameter. It will be appreciated that the tubes need not necessarily be round in shape.

The tubes e.g., 16A and 16B may be of any suitable length in order to conveniently sealably connect to a proximately placed electrolyte manifold, e.g., 30A and 30B, at a respective manifold minor input/output as discussed below. In an exemplary embodiment, the tube length may range from about 2 inches to about 12 inches.

Still referring to FIG. 2A, in an exemplary embodiment, one or more pouches, e.g., 14A, 14B, 14C are placed proximate a respective manifold e.g., an electrolyte-in manifold 30A and an electrolyte-out manifold 30B and each of the at least two tubes e.g. 16A and 16B, associated with a respective pouch are sealably connected (e.g., substantially air tight) to a respective input e.g., 18A, 18B of the respective manifolds 30A and 30B to provide sealable communication (e.g., impervious to external air) with the manifolds to provide flow of an electrolyte from a respective manifold into and/or out of an interior of a respective pouch e.g., 14A, 14B, 14C.

In an exemplary embodiment, the respective manifolds 30A and 30B may be provided together with the respective pouches, e.g., 14A, and tubes 16A, 16B, as a one piece structure, e.g., whereby the respective tubes are molded-in (sealably connected) to a respective manifold during the pouch and/or manifold manufacturing process. It will be appreciated that the respective manifolds may vary in size depending on the number of pouches desired to be serviced at one time. For example, the respective manifolds may be sized such that the number of pouches that may be serviced at one time, such as in a battery rejuvenation process discussed below, may be from about 10 to about 400, more preferably, from about 100 to about 300.

In another exemplary embodiment, the respective manifolds 30A and 30B may be provided as sealably connected together smaller manifold modules with the ability to service a selected number of respective pouches (e.g., provided with associated pouch tubing inputs) or optionally provided with pre-molded sealably connected tubes. Each of the manifold modules may then be further sealably connected to another manifold module e.g., at a major manifold module input/out as discussed below in order to carry out a pouch rejuvenation process. For example, a particular manifold module may be sized with respective pouch tube inputs/outputs where the number of pouches that may be conveniently serviced at one time by the respective manifold modules may be from about 5 to about 100, or from about 10 to about 50.

In another exemplary embodiment, the respective manifolds 30A and 30B may be attached and/or detached from the respective pouch tubes e.g., 16A and 16B in a separate process, for example as part of a pouch rejuvenation process as further explained below.

Figure 2B:
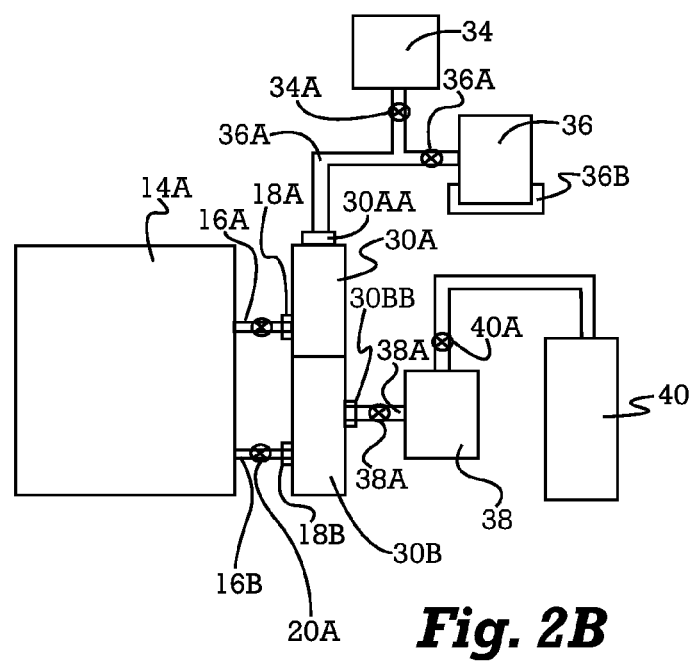
FIG. 2B is a front view of electrolyte manifolds that may be used in rejuvenating one or more lithium ion batteries according to an exemplary embodiment.

Referring to FIG. 2B, showing a front view of a plurality of pouches where only a single pouch e.g., 14A may be visible, in another exemplary embodiment, the respective manifolds e.g., electrolyte-in manifold 30A and electrolyte-out manifold 30B may be stacked on top of one another or formed as a single structure with manifold portions 30A and 30B sealably isolated from one another and where each manifold communicates with a respective tube e.g., 16A and 16B.

Referring to FIGS. 2A and 2B in an exemplary embodiment the tubes 16A and 16B are attached to respective sealable manifold inputs 18A and 18B that may be made of a material that can readily be sealably attached to the tubes e.g., impervious to external air. For example, in one exemplary embodiment the respective manifolds 30A and 30B, or at least the respective sealable inputs 18A and 18B portions may be made of the same material as the tubes 16A and 16B whereby the tubes are sealably attached by welding or melting (thermally fusing) a respective tube, 16A and 16B, to a respective sealable input, 18A and 18B. For example, an outermost layer of the respective tubes and the respective manifold inputs may include a thermally fusible plastic material, and the sealable connection made by applying a heat source to a respective tube, 16A and 16B, inserted into a respective input, 18A and 18B.

In another exemplary embodiment, each of the manifolds 30A and 30B may include at least one main input/output plug e.g., 30AA and 30BB for sealably attaching plastic tubing, which may be made of the same or similar material as the pouch tubing to enable in making thermally fused connection to another manifold module and/or the introduction and/or extraction of electrolyte to and/or from a respective manifold 30A and 30B.

In another exemplary embodiment, two-way flow valves e.g., 20A may be included between a respective manifold and a pouch, for example, at least between a respective pouch and an electrolyte-in manifold (where electrolyte/solvent is supplied to the respective pouches). A variety of valves may be utilized including, but not limited to, one-way, flapper or two-way valves. It will be appreciated that the two-way valves e.g., 20A, may be included between a respective pouch and each of the manifolds 30A, 30B. The two-way valves may be molded into one or more of the tubes associated with an individual pouch or may be molded into one or both of the respective manifolds 30A, 30B. The valves may be sealably molded-in during manufacture of the pouches and/or associated manifold portions 30A and 30B, or sealably thermally fused or welded in a separate process following manufacture. The flow valves e.g., 20A, advantageously allow for different electrolytes to be selectively introduced and/or isolated from a respective pouch connected to a respective manifold.

In an exemplary lithium ion battery rejuvenation method, one or more fresh electrolyte sources e.g., 34, and one or more solvent sources e.g., 36 (including optional heating device 36B) are sealably connected (via tubing 36B and optional valves 34A, 36A) to the electrolyte-in manifold 30A, e.g., via main manifold input 30AA. One or more used electrolyte containers 38 (with optional valve 38A) may be sealably connected (via tubing 38B) to the electrolyte-out manifold 30B, e.g., via main manifold output 30BB. The electrolyte-out manifold 30B and/or used electrolyte container 38 may further be connected to a vacuum (e.g., negative pressure source 40 with optional valve 40A) to drive flow of the electrolyte into and/or out of the respective pouches and manifolds. The electrolyte-in manifold 30A and/or solvent source 36 and/or fresh electrolyte source 34 may optionally be connected to a positive pressure source (e.g., positive pressure source 42 with optional valves e.g. 42A) to assist in driving flow of fresh electrolyte and/or solvent into and/or out of the respective pouches e.g., 14A, 14B, 14C, and manifolds 30A and 30B.

A shown in FIG. 2B, it will be appreciated that only one of a negative pressures source 40 (or a positive pressure source) may be included to operate the flow of electrolytes into and/or out of the respective manifolds e.g., 30A, 30B, and pouches e.g., 14A, 14B, 14C.

Figure 3:
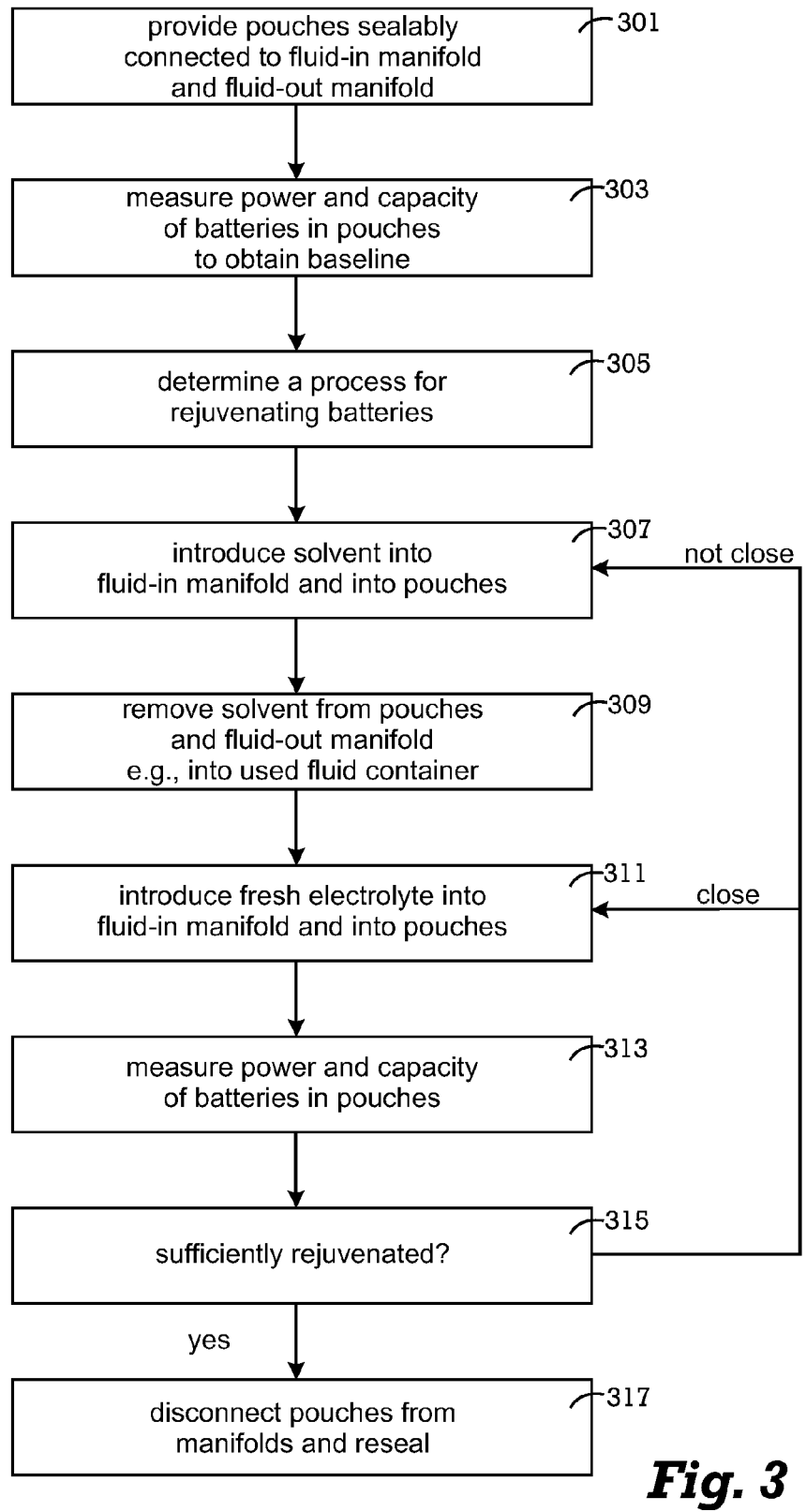
FIG. 3 illustrates a logic flow diagram for rejuvenating a lithium ion battery according to an exemplary embodiment.

Referring to FIG. 3, in an exemplary process flow of an exemplary battery rejuvenation method using the pouches and manifolds as outlined above, in step 301 one or more pouches e.g., 14A, 14B, 14C, are provided sealably connected (e.g., substantially air tight to ensure a water-vapor free and air-free environment) to a respective electrolyte-in (fluid-in) manifold e.g., 30A and a respective electrolyte-out (fluid-out) manifold e.g., 30B such as shown in FIGS. 2A and 2B.

In step 303, the power and capacity (state of electric charge) of respective lithium ion batteries making up a plurality of individual batteries (battery pack) e.g., such as 10 contained in respective pouches e.g., 14A, 14B, 14C, may be measured by conventional means, either individually or as connected in series, to establish a baseline for power and capacity. It will be appreciated that the power and capacity measurement may be made prior to connecting to respective manifolds.

Next, in step 305, a determination may be made as to the process for rejuvenating one or more batteries based on the measured power and capacity from step 303. The parameters may include the types and amount of solvent to be introduced to remove an SEI layer, the amount of time the solvent should be left in a pouch in contact with a battery to fully dissolve associated SEI layers, and the necessity for pre-heating the solvent prior to introduction into a respective pouch.

Next, in step 307, one or more solvents, optionally preheated to a predetermined temperature, may be introduced into the manifold 30A and thereafter substantially simultaneously to one or more pouches e.g., 14A, 14B, and 14C, and left for a pre-determined period of time. It will be appreciated that the old electrolyte is at least partially displaced out of the respective pouches upon introduction of a solvent.

Next, in step 309, following the pre-determined period of time e.g., sufficient to allow dissolution of the SEI layer following introduction of the solvent into the one or more pouches via the manifold 30A, the dissolved SEI layer components and liquid electrolyte may then be removed from one or more of the pouches substantially simultaneously. The removed solvent and liquid electrolyte may be preferably captured in a suitable container e.g., 38, for subsequent disposal, recycling or resale.

Next, in step 311, following removal of the dissolved SEI layer components and liquid electrolyte, one or more fresh liquid electrolytes may be respectively introduced into one or more pouches e.g., 14A, 14B, and 14C, from one or more electrolyte sources e.g., 34, through manifold 30A and thereafter substantially simultaneously into one or more pouches. It will be appreciated that each of the pouches associated with a battery pack (e.g., a plurality of pouch type batteries arranged in series) may be refilled with the same or different electrolytes.

It will also be appreciated that removal of the solvent in step 307 may take place in a separate step prior to introduction of fresh solvent and/or simultaneously with introduction of fresh electrolyte in step 309, e.g., where used solvent is at least partially displaced out of the respective pouches upon introduction of a solvent. It will further be appreciated that introduction or flow of fresh solvent may optionally include an intermediate rinsing step or that introduction or flow of fresh solvent preferably takes place for a period of time to substantially remove the used solvent.

Next, in optional step 313, the batteries within (associated with) the respective pouches may be tested (individually or together) in-situ prior to disconnection of solvent and electrolyte sources to determine a power and capacity, e.g., including comparing to a baseline determined in step 303 to determine whether an individual battery and/or a plurality of the batteries are sufficiently rejuvenated, e.g., that the power and/or capacity is greater than a predetermined threshold value.

In step 315, if it is determined that a battery and/or the plurality of batteries is not sufficiently rejuvenated the process may began again at step 307 to introduce additional solvent, for example if the degree of rejuvenation is less than a threshold value (not sufficiently close) or at step 311 to introduce additional fresh electrolyte if the degree of rejuvenation is greater than a threshold value (close but not acceptable). It will be appreciated that battery testing may also occur following step 315, below.

In another exemplary embodiment, additionally or alternatively to testing battery capacity and power, the composition of the material removed from the pouches may be periodically chemically tested to determine its composition through conventional chemical analysis methods such as capillary electrophoresis. For example, when the composition of the material removed from the pouches shows a decrease in the amount of LiF or other deleterious material associated with a dissolved SEI layer below a predetermined threshold level, a battery and/or a plurality of batteries (e.g., bank of batteries is series) may be considered sufficiently rejuvenated.

Next, in step 317, if it is determined that the battery and/or the plurality of batteries is sufficiently rejuvenated, the respective manifolds e.g., 30A and 30B may be disconnected from electrolyte/solvent containers and/or other manifold modules and sealably closed and left in place. Alternatively, the respective manifolds may be removed from the respective pouches, and the respective tubes associated with each pouch e.g., 16A and 16B, sealably closed to complete the rejuvenation process.

It will be appreciated that connecting (e.g., step 301) and/or disconnecting (e.g., step 317) of respective manifolds and/or pouch tubes may take place in a fully or partially inert gas atmosphere e.g., argon, and/or nitrogen, for example, where an inert gas may be blown onto (externally) and/or through respective connection inputs/outputs during connection/disconnection. Alternatively, a vacuum may be used rather than positive pressure argon. For example, an external hose may be connected to the pouch and the air in the hose evacuated and then the hose is filled with the fluid. For example, inert gas may be blown through a separate input/output in a respective manifold during disconnection of connecting tubes from manifold inputs e.g., 18A, 18B, or 30AA and 30BB. Additionally or alternatively, inert gas may be bubbled through the electrolyte within the pouches to provide a positive pressure outflow at respective inputs/outputs as connecting tubing is being disconnected to prevent or minimized introduction of external air and water vapor into the pouches.

It will be appreciated that the above rejuvenation process, with the respective manifolds 30A, 30B and/or tubes 16A, 16B as part of the structure of an operating pouch-type lithium ion battery bank, advantageously allows a battery rejuvenation process to be carried out in-situ, e.g., without removing, or with only partial removal the respective batteries and pouches from an operating configuration.

The lithium ion battery rejuvenation techniques described herein may provide a substantial cost savings, wherein the basic material costs for originally forming the lithium ion batteries 10 is very expensive. It is envisioned that lithium ion batteries for use in vehicles, in one exemplary usage, may be rejuvenated and reused in an on-site facility while the vehicle owner waits. In another exemplary usage, the lithium ion battery may be removed from the vehicle and replaced with a new or rejuvenated lithium ion battery, while the removed lithium ion battery may be restored for subsequent use, thus saving vehicle owners and manufactures substantial costs normally associated with replacement and/or warranties. Moreover, the rejuvenation techniques of the exemplary embodiments may be utilized on other prismatic lithium ion batteries, including other pouch type lithium ion batteries of differing configurations, and fall within the scope of the exemplary embodiments described herein.

The above description of embodiments of the invention is merely exemplary in nature and, thus, variations thereof are not to be regarded as a departure from the spirit and scope of the invention.

What is claimed is:

1. A method for rejuvenating a pouch type lithium ion battery, comprising:

providing at least one pouch sealably connected via a first tubing to a first manifold, said at least one pouch containing a first electrolyte and an electrode assembly, said at least one pouch sealably connected against an external atmosphere;

introducing a solvent into the first manifold and into said at least one pouch to treat a respective electrode assembly contained within said at least one pouch;

removing a substantial portion of said solvent from said at least one pouch;

introducing a second electrolyte into the first manifold and into said at least one pouch; and, sealing the pouch against said external atmosphere.

2. The method of claim 1, further comprising connecting said at least one pouch sealably connected against an external atmosphere via a second tubing to a second manifold.

3. The method of claim 1, wherein said first tubing is provided pre molded into said at least one pouch.

4. The method of claim 1, wherein said first tubing is provided sealably pre-molded into said first manifold.

5. The method of claim 2, wherein said second tubing is provided sealably pre-molded into said at least one pouch.

6. The method of claim 2, wherein said second tubing is provided sealably pre-molded into said second manifold.

7. The method of claim 1, wherein said first manifold is adapted to be sealably connected to at least another manifold to comprise a larger dimension manifold.

8. The method of claim 1, wherein said first manifold is sealably connected to a first fluid source comprising said solvent and a second fluid source comprising said second electrolyte.

9. The method of claim 2, wherein said second manifold is sealably connected to a fluid container adapted to receive fluid exiting said at least one pouch and said second manifold.

10. The method of claim 1, wherein said first manifold is sealably connected to said at least one pouch such that fluid enters and or exits from said at least one pouch and said first manifold with the aid of at least one of a positive pressure and a negative pressure.

11. The method of claim 2, wherein said second manifold is connected to said at least one pouch such that fluid enters and or exits from said at least one pouch and said second manifold with the aid of at least one of a positive pressure and a negative pressure.

12. The method of claim 1, wherein the step of providing at least one pouch sealably connected comprises connecting said at least one pouch and/or said first manifold in the presence of an inert gas.

13. The method of claim 1, wherein said solvent comprises a carbonate solvent.

14. The method of claim 1 further comprising determining a power and capacity of a battery associated with said at least one pouch prior to the step of introducing a solvent.

15. The method of claim 1 further comprising determining a power and capacity of a battery associated with said at least one pouch following the step of introducing a second electrolyte.

16. The method of claim 14 further comprising chemically analyzing the composition of fluid exiting said at least one pouch and predicting a level of power and capacity of a battery associated with said at least one pouch.

17. The method of claim 1 wherein said at least one pouch comprises a plurality of pouches, each pouch containing an electrode assembly.

18. A method for rejuvenating a pouch type lithium ion battery, comprising:

providing a plurality of pouches, each pouch containing a first electrolyte and an electrode assembly;

said plurality of pouches each sealably connected against an external atmosphere to a fluid-in manifold by a first tubing and to a fluid-out manifold by a second tubing;

introducing a solvent into the fluid-in manifold and into one or more of said plurality of pouches to treat a respective electrode assembly contained within said one or more of said plurality of pouches;

removing a substantial portion of said solvent from one or more of said plurality of pouches to said fluid-out manifold;

introducing at least a second electrolyte into the fluid-in manifold and into one or more of said plurality of pouches; and, sealing said plurality of pouches against said external atmosphere.

19. The method of claim 18, wherein said first and second tubing is provided sealably pre-molded into one or more of said plurality of pouches.

20. A system for rejuvenating a pouch type lithium ion battery, the battery including an electrode assembly substantially contained within a pouch, comprising:

a plurality of pouches, each pouch containing an electrolyte and an electrode assembly;

said plurality of pouches each sealably connected against an external atmosphere to a fluid-in manifold by a respective first tubing; and, a solvent source and an electrolyte source sealably connected to the fluid-in manifold, said system adapted to sequentially introduce said solvent and said electrolyte through said fluid-in manifold and into one or more of said plurality of pouches to treat a respective electrode assembly.

21. A method for rejuvenating a pouch type lithium ion battery, comprising:

providing at least one pouch sealably connected via a first tubing to a first manifold, said at least one pouch containing a first electrolyte and an electrode assembly, said at least one pouch sealably connected against an external atmosphere;

introducing a pre-heated solvent into the first manifold and into said at least one pouch to treat a respective electrode assembly contained within said at least one pouch;

removing a substantial portion of said pre-heated solvent from said at least one pouch;

introducing a second electrolyte into the first manifold and into said at least one pouch; and, sealing the pouch against said external atmosphere.

22. A method for rejuvenating a pouch type lithium ion battery, comprising:

providing a plurality of pouches, each pouch containing a first electrolyte and an electrode assembly;

said plurality of pouches each sealably connected against an external atmosphere to a fluid-in manifold by a first tubing and to a fluid-out manifold by a second tubing;

introducing a pre-heated solvent into the fluid-in manifold and into one or more of said plurality of pouches to treat a respective electrode assembly contained within said one or more of said plurality of pouches;

removing a substantial portion of said pre-heated solvent from one or more of said plurality of pouches to said fluid-out manifold;

introducing at least a second electrolyte into the fluid-in manifold and into one or more of said plurality of pouches; and, sealing said plurality of pouches against said external atmosphere.

23. A system for rejuvenating a pouch type lithium ion battery, the battery including an electrode assembly substantially contained within a pouch, comprising:

a plurality of pouches, each pouch containing an electrolyte and an electrode assembly;

said plurality of pouches each sealably connected against an external atmosphere to a fluid-in manifold by a respective first tubing; and, a pre-heated solvent source and an electrolyte source sealably connected to the fluid-in manifold, said system adapted to sequentially introduce said pre-heated solvent and said electrolyte through said fluid-in manifold and into one or more of said plurality of pouches to treat a respective electrode assembly.

\* \* \* \* \*